United States Patent

[11] 3,562,616

| | | |
|---|---|---|
| [72] | Inventor | Royston David Elliott<br>Basingstoke, England |
| [21] | Appl. No. | 789,478 |
| [22] | Filed | Jan. 7, 1969 |
| [45] | Patented | Feb. 9, 1971 |
| [73] | Assignee | Lansing Bagnall Limited<br>Basingstoke, England<br>a British company |
| [32] | Priority | Jan. 9, 1968 |
| [33] | | Great Britain |
| [31] | | 1304/68 |

[54] CONTROL SYSTEMS FOR ELECTRIC MOTORS
4 Claims, 3 Drawing Figs.

[52] U.S. Cl. .................................................. 318/332,
318/252, 318/353
[51] Int. Cl. ................................................ H02p 5/16,
H02p 5/18
[50] Field of Search .......................................... 318/297,
332, 345, 346, 347, 434; 338/32

[56] References Cited
UNITED STATES PATENTS

| 3,230,436 | 1/1966 | Holford .......................... | 318/297 |
| 3,447,056 | 5/1969 | Kosaka et al. ................... | 318/332 |

Primary Examiner—Oris L. Rader
Assistant Examiner—Thomas Langer
Attorney—Martin Kirkpatrick ABSTRACT: A motor drive circuit in which a direct current motor is fed with pulses of current by means of a controlled rectifier connected as a power switch between a power source and the motor. The conduction of the rectifier is controlled by a potential divider one element of which is a flux-responsive resistor adjacent a conductor of armature current. The divider is energized with a constant voltage thereby avoiding use of a free-running pulse generator as a source of trigger pulses for the rectifier. A coil adjacent the resistor provides additional flux through the resistor for controlling the pulse rate of the motor.

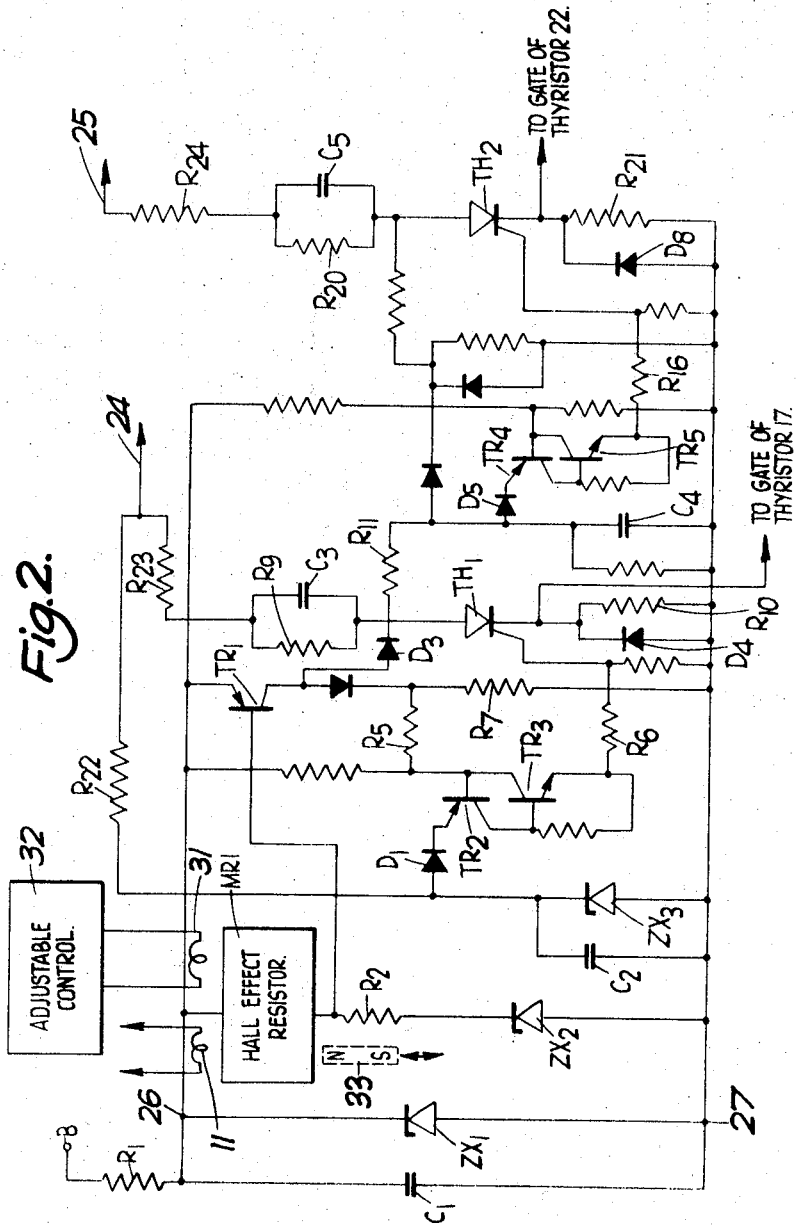

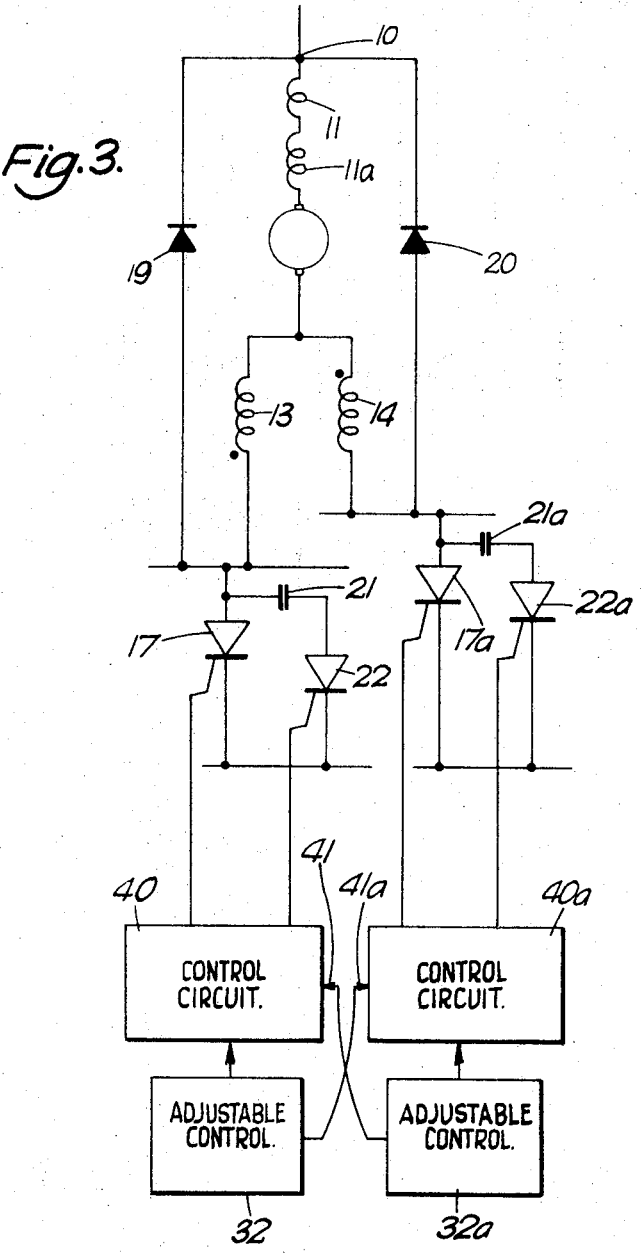

CONTROL SYSTEMS FOR ELECTRIC MOTORS

BACKGROUND TO THE INVENTION

The present invention relates to control systems for electric motors and particularly to motor drive systems in which a controllable rectifier is connected as a power switch between the motor and a source of direct current. In such systems the frequency of pulses applied to the control input of the controllable rectifier determines the speed of, or power developed by, the motor. It is conventional in such circuits to provide means such as a freewheeling diode which is arranged to provide a loop in which armature current flows during interpulse periods.

It is known, for example from our prior British Pat. No. 1136253, to provide a pulse generator which provides pulses, for application to a thyristor, at a regular rate and a transductor having one winding through which armature current is arranged to flow and another winding which shunts one of the output stages of the pulse generator. In such a system, armature current flowing through the first winding tends to saturate the transductor so as to prevent any application of pulses to the control circuit. By providing (for example) other means for saturating the magnetic circuit of the transductor it is possible to vary the value of armature current required to saturate the transductor and thereby to permit the motor to run at a different speed.

However, this and similar systems require a fairly complex pulse generator and it is one object of the present invention to provide an improved control system which avoids the need for a pulse generator providing pulses at a regular repetition frequency.

BRIEF DESCRIPTION OF THE INVENTION

According to the invention, the control circuit for the controllable rectifier includes a variable impedance element that is energized by a steady signal. A trigger circuit is, directly or indirectly, responsive to the signal developed across the impedance element. The trigger circuit has a predetermined threshold level, and is triggered when the armature current attains a predetermined value, which is adjustable.

With the present invention, in distinction to the above-mentioned prior arrangement the control pulses for the control circuit, which may include a thyristor, are generated without recourse to any pulse generator as such. Instead, the impedance of an element normally energized by a signal of constant amplitude, normally a direct signal but possibly an alternating signal of constant amplitude, is varied; owing to the impedance variation, either the voltage across or the current through the element varies with armature current; thus the detecting means will serve to prevent the release of a pulse to the control circuit when the armature current is relatively high and will permit the release of a pulse to the control circuit when the armature current is relatively low. An adjustable means effectively alters the value of armature current dividing the "relatively high" range from the "relatively low" range. Because the armature current rises when a pulse of current occurs and subsequently dies away, speed variation is effected by adjusting the adjustable means.

The adjustable means may assume a variety of forms. It would be possible to provide means for altering the energization of the element or for altering the threshold level of the detecting means. The element may form part of a voltage divider network, means being provided to energize the network with a voltage of constant amplitude. In this case there may be provided an adjustable resistor, in series with said element and forming part of the voltage divider network. A further and preferred possibility is to constitute said element by a magneto or Hall effect resistor or other element whose impedance varies according to the magnetic flux through it. There would be provided a conductor or winding (adjacent the element or magnetoresistor) through which conductor or winding armature current is arranged to flow and for adjusting the relation between the resistance of the resistor and the armature current there may be provided a permanent magnet movable towards and away from the element resistor, or other means, such as a further coil arranged to carry a manually variable current, independent of the armature current, to vary the magnetic flux through the element or resistor.

It is usual in control systems of the general kind that have been described to provide two gate-controlled rectifiers such as thyristors. One thyristor will control the application of "on" pulses to the motor and will be associated with a second thyristor via a commutating capacitor arrangement. As is well known, when either thyristor conducts the commutating capacitor ensures that the conduction of the other thyristor is rapidly extinguished. In the system as described in the aforementioned patent a pulse subsequent to one that triggers the main thyristor is fed to the auxiliary thyristor so that, by means of a commutating capacitor arrangement, the conduction of the main thyristor can be stopped after the termination of an "on" pulse. Likewise, the application of a pulse to the main thyristor is caused to extinguish the conduction of the auxiliary thyristor. The present invention includes in a preferred embodiment a similar arrangement.

An electric motor for use in a system as described conveniently has two field windings, one of which is energized according to the desired direction of rotation of the motor forward and reverse field windings are energized using the same control circuit. However, if the windings are controlled separately each by a control circuit as described, it is readily possible to provide a simple changeover switch which is inserted in appropriate locations in the two control systems to effect operation of either one or the other according to the direction of rotation of the motor required. This completely avoids the use of heavy duty contractors for reversing the motor since the changeover switch or switches can be provided in a relatively low current, low power part of the control systems.

According to this aspect of the invention therefore the motor has two series field windings arranged to provide when energized motive effort in opposite directions, each winding being associated with a control system as hereinbefore described, there being means provided to render one of the control circuits inoperative in response to adjustment of the adjustable means for the other, and vice versa. With this arrangement reversal of the motor can be effected without any heavyduty switch.

BRIEF DESCRIPTION OF THE DRAWINGS

FIGS. 1 and 2 illustrate different parts of a control system for an electric series motor; and FIG. 3 illustrates schematically a further control system.

DETAILED DESCRIPTION OF THE PREFERRED EMBODIMENTS

Figure 1:
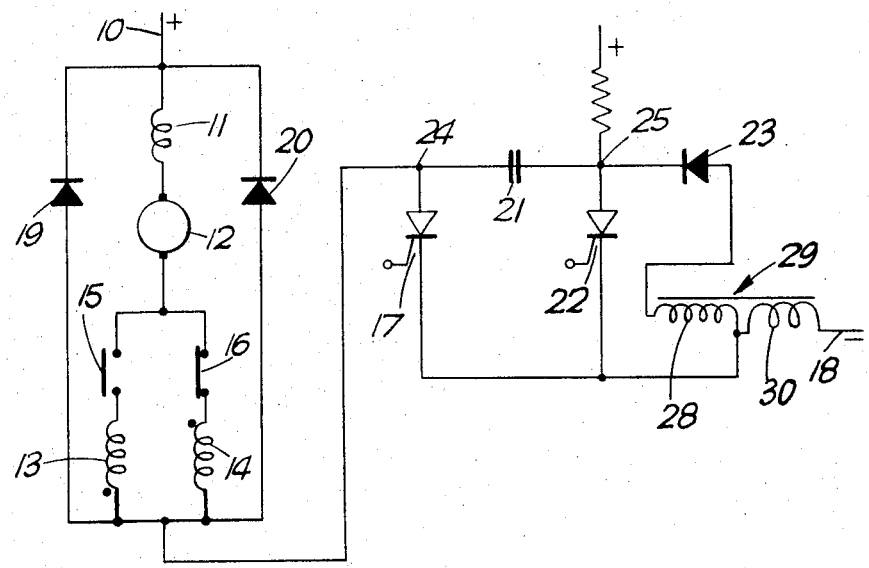

It should be explained that in FIGS. 1 and 2 many conventional parts of the control system such as conductors, fuses and various other protection devices have been omitted for simplicity. As such they do not bear any direct relation to the present invention and will not be described. Referring firstly to FIG. 1, there is provided a positive supply terminal 10 through which current can flow through a winding 11 (whose function will be described later) the armature 12 of a DC series motor, and alternatively through one of two series field windings 13 or 14 according to which of the two contacts 15 and 16 is closed. Freewheeling diodes 19 and 20 are provided between the lower ends of the field windings 13 and 14 respectively and the supply terminal 10 in order to provide a loop in which armature current can flow during interpulse periods. The windings 13 and 14 are arranged to provide fields in opposite senses, the contact 15 or 16 being closed according to the desired direction of rotation of the motor 12.

To the lower end of the windings 13 and 14 is coupled an anode of a thyristor 17 whose cathode is coupled to the negative supply terminal 18 through the primary winding 30 of a transformer 29. To a point 24 connected to the anode of the thyristor 17 is coupled a commutating capacitor 21 coupled to a junction point 25 between which and the winding 30 is coupled a second thyristor 22. The point 25 is coupled to a positive supply via a suitable resistor and a diode 23 is coupled between the point 25 and the negative supply terminal 18 through the secondary 28 and the primary 30 of the transformer 29. The capacitor 21 and the diode 23 together with the transformer 29 form a conventional commutating capacitor arrangement which will be well known to those skilled in the art.

The system of FIG. 1 is conventional, being common to many arrangements in which a series motor is pulse controlled. Reference will now be made to FIG. 2 to explain the main features of the present invention.

In the embodiment being described, the control of the application of gating pulses to the thyristor 17 is effected by means of a voltage divider network comprising a magnetoresistor MR1, a resistor R2 and a Zener diode ZX2. The resistor MR1 is of the kind whose resistance varies as the flux applied to it and for the purpose of applying flux to the resistor the winding 11 is employed. This winding will pass armature current and will cause the raising or lowering of the resistance of MR1 in accordance with the value of armature current. In order to vary the relationship between armature current and the effect of the resistor MR1, so as to provide as previously explained variation of the speed of the motor 12, the voltage division performed by the potential divider network must be altered. This could be provided by arranging for the resistor R2 to be a variable resistor but also possible is to provide a permanent magnet, connected to an accelerator pedal, arranged to move relative to the resistor MR1 so as to vary the flux through the resistor MR1 independently of the armature current. In the diagram there is shown a coil 31 through which an adjustable current from a suitable control 32 flows.

The circuit of FIG. 2 will now be described in detail. Voltage for the circuit is provided between a positive rail 26 and a negative rail 27. The positive rail 26 is coupled through a resistor R1 to a positive voltage source B. The disposition of the remainder of the components will be readily apparent from the drawing and from the following explanation of the function of the circuit.

The voltage between the rails 26 and 27 is maintained constant by a capacitor C1 and a Zener diode ZX1. Also across the rails is coupled the potential divider network comprising the resistor MR1 and R2 and the Zener diode ZX2. The voltage at the junction of the resistor R2 and the magnetoresistor MR1 is sensed by the base/emitter circuit of a PNP transistor TR1. When the resistance of the magnetoresistor MR1 is high (corresponding for example to a relatively high armature current) the voltage developed across it is sufficient to turn on transistor TR1. When this occurs, the potential at the collector of transistor TR1 rises and a capacitor C4 is charged via a diode D3 and a resistor R11 until the potential at the upper plate of the capacitor exceeds the base potential of a transistor TR4. This transistor and transistor TR5 will turn on and discharge the capacitor C4 through a diode D5 and a resistor R16 into the gate of a thyristor TH2. Accordingly, this thyristor turns "on" and supplies a high pulse of current via a resistor R24 and a capacitor C5 to the gate of the "off" thyristor 22 of FIG. 1. When this thyristor turns on the potential at point 25 falls, removing the gate signal and also clamping capacitor C4 at approximately one volt. This turns off transistors TR4 and TR5 and in this condition no pulse is supplied to the motor.

When the thyristor 22 is "on" the thyristor 17 (FIG. 1) is "off" and a capacitor C2, which is coupled to the point 24 via a resistor R22, is rapidly charged via the resistor R22; the Zener diode ZX3 clamps the capacitor C2 at approximately 15 volts. When the transistor TR1 is turned on the base of a transistor TR2 is held above the voltage of capacitor C2 so that the transistors TR2, TR3 are inhibited from releasing an "on" pulse.

When however, the resistance of the magnetoresistor MR1 decreases with decreasing armature current the transistor TR1 starts to turn off. The decreasing voltage at the junction of resistors R5 and R7 effects, when the voltage falls below 15 volts, the turning on of transistors TR2 and TR3 so as to discharge the capacitor C2 into the gate of thyristor TH1 via a diode D1 and a resistor R6; the conduction of thyristor TH1 supplies a high pulse current via a resistor R23 and a capacitor C3 to the gate of the thyristor 17 in FIG. 1. As before, when this thyristor turns on, the potential at point 24 falls, removing the gate signal and clamping the voltage across the capacitor C2 at approximately 1 volt. This turns off the transistors TR2 and TR3.

The conduction of thyristor 17 will cause, via the commutating capacitor arrangement, reverse current to flow through the thyristor TH2 via a diode D8, capacitor C5 and a resistor R24, as well as the commutating thyristor 22, which allows the capacitor 21 to charge. The thyristor TH2 is turned off, allowing the potential at the anode thereof to rise. This also allows the capacitor C4 to be charged again when the transistor TR1 turns on due to the armature current reaching its preset limit. The time constant of the network comprising the resistor R11 and the capacitor C4 determines the minimum "on" time of thyristor 17 (approximately one millisecond).

When an "off" pulse if fired to the thyristor 22 the thyristor 17 is turned off via the main commutating capacitor. The negative pulse at point 24 causes reverse current flow through the thyristor TH1 via diode D4, the capacitor C3 and the resistor R23. This turns off the thyristor TH1 and allows the potential of the anode thereof to rise in sympathy with the anode of the thyristor 17.

It will be seen therefore that the transistor TR1 controls the firing of both "on" and "off" pulses and is in turn controlled both by the armature current and in a preferred embodiment additional magnetic flux produced by the coil 31 (or, if preferred, a permanent magnet 33). The control 32 or the magnet would normally be operated by an accelerator pedal where the motor 12 is incorporated in an industrial truck or other battery operated vehicle.

The diodes and resistors D4, R10 and D8, R21 respectively are provided to prevent the gate of the respective trigger thyristor TH1 or TH2 going negative. The RC networks R9, C3 and R20, C5 ensure that a steep, high value pulse is obtained so that the main thyristors are rapidly turned on.

The functions of the unreferenced components in FIG. 2 will be readily apparent and will not be described.

Normally the terminals 10 and 18 are terminals of a battery.

FIG. 3 illustrates an arrangement in which the motor 12 has two field windings 13 and 14 each controlled separately by a control circuit of the kind shown in FIG. 2. Only the principal parts of the arrangement are shown. The field winding 13 is controlled by two thyristors 17 and 22, with commutating capacitor 21 as in the circuit of FIG. 1 and the conduction of the thyristors 17 and 22 is determined by a control circuit 40 as shown in FIG. 2. In like manner a similar control circuit 40a determines the conduction of the thyristors 17a and 22a which are coupled by the commutating capacitor 21a and which control the current through the series field winding 14. For each control circuit 40,40a there is provided a sensing winding 11,11a as in FIG. 1.

Each control circuit 40 and 40a has an adjustable control circuit, 32 and 32a respectively as before: as indicated hereinbefore each control circuit 40 and 40a has an input 41, 41a respectively; the operation of each control 32 or 32a is caused, in any convenient manner, to apply a signal to the input 41a or 41 of the other control circuit, so that only one of the windings 13 and 14 can be energized at a time.

I claim:

1. A motor drive circuit comprising a source of direct current, a direct current motor having armature and field, a controllable rectifier connected as a power switch between the source and the motor for energizing said motor with pulses of current in response to control pulses, said controllable rectifier having a control input, and a control circuit for feeding control pulses to said control input, the control circuit comprising:
- a triggerable pulse generating circuit having an output coupled to said control input and an input having a predetermined threshold level;
- a series combination of a magnetic flux-responsive resistor and a further resistor;
- direct current energizing means energizing said series combination with a steady voltage, the input of said triggerable pulse-generating circuit being coupled to the junction of said resistors;
- a conductor coupled to said armature and disposed adjacent the magnetic flux-responsive resistor for producing magnetic flux through said magnetic flux-responsive resistor in accord with the armature current of said motor; and
- means for varying the resistance of one of said resistors independently of said armature current.

2. A motor drive circuit as set forth in claim 4 in which the adjustable means comprises a coil disposed adjacent the magnetic flux-responsive resistor and adjustable circuit means for feeding current through said coil.

3. A motor drive circuit as set forth in claim 4 in which the adjustable means comprises a permanent magnet.

4. A motor drive circuit as set forth in claim 1 in which said means for varying the resistance of one of said resistors comprises adjustable means for producing additional flux through said magnetic flux-responsive resistor.